United States Patent
Jeon

(10) Patent No.: US 11,110,905 B2
(45) Date of Patent: Sep. 7, 2021

(54) SOLENOID VALVE FOR BRAKE SYSTEM

(71) Applicant: MANDO CORPORATION, Pyeongtaek-si (KR)

(72) Inventor: In Wook Wook Jeon, Seoul (KR)

(73) Assignee: Mando Corporation, Pyeongtaek-si (KR)

( * ) Notice: Subject to any disclaimer, the term of this patent is extended or adjusted under 35 U.S.C. 154(b) by 0 days.

(21) Appl. No.: 16/139,152

(22) Filed: Sep. 24, 2018

(65) Prior Publication Data

US 2019/0092305 A1    Mar. 28, 2019

(30) Foreign Application Priority Data

Sep. 25, 2017   (KR) .................. 10-2017-0123541

(51) Int. Cl.
| | |
|---|---|
| *B60T 15/02* | (2006.01) |
| *F16F 1/36* | (2006.01) |
| *F16F 1/373* | (2006.01) |
| *F16K 31/06* | (2006.01) |
| *F16K 31/10* | (2006.01) |
| *B60T 15/04* | (2006.01) |
| *B60T 8/36* | (2006.01) |

(52) U.S. Cl.
CPC .......... *B60T 15/028* (2013.01); *B60T 8/363* (2013.01); *B60T 15/043* (2013.01); *F16F 1/3605* (2013.01); *F16F 1/3732* (2013.01); *F16K 31/0655* (2013.01); *F16K 31/0696* (2013.01); *F16K 31/10* (2013.01); *F16F 2224/02* (2013.01)

(58) Field of Classification Search
CPC ...... B60T 15/028; B60T 15/043; B60T 8/363; F16K 31/0655; F16K 31/0696; F16K 31/10; F16F 1/3605; F16F 1/3732; F16F 2224/02

See application file for complete search history.

(56) References Cited

U.S. PATENT DOCUMENTS

| | | | | |
|---|---|---|---|---|
| 3,455,532 A | * | 7/1969 | Barker | F16K 31/0675 251/29 |
| 3,470,892 A | * | 10/1969 | Barker | H03K 3/354 137/1 |
| 3,707,992 A | * | 1/1973 | Ellison | F16K 31/0627 137/625.65 |
| 4,901,974 A | * | 2/1990 | Cook | F16K 31/0696 251/129.05 |

(Continued)

FOREIGN PATENT DOCUMENTS

| | | |
|---|---|---|
| KR | 10-1622149 B1 | 5/2016 |
| KR | 2016-0091565 A | 8/2016 |

*Primary Examiner* — Kevin F Murphy
*Assistant Examiner* — Jonathan J Waddy
(74) *Attorney, Agent, or Firm* — Morgan, Lewis & Bockius LLP

(57) ABSTRACT

A solenoid valve for brake system includes a valve housing installed in a modulator block, and having an oil flow path; a valve seat installed in the inside of the valve housing, and forming an orifice; an armature configured to move up and down by a magnet core in the valve housing, and to open or close the orifice; a sleeve coupled with the valve housing, and accommodating the armature therein; a restoring spring configured to provide an elastic restoring force to the armature to close the orifice normally; and a damper member interposed between the magnet core and the armature.

11 Claims, 5 Drawing Sheets

(56) References Cited

U.S. PATENT DOCUMENTS

| | | | | |
|---|---|---|---|---|
| 4,951,917 A * | 8/1990 | Faulkner, III | B05C 5/0225 | 251/129.15 |
| 5,375,738 A * | 12/1994 | Walsh | B05C 5/001 | 222/1 |
| 5,535,919 A * | 7/1996 | Ganzer | B05C 5/001 | 222/1 |
| 5,553,829 A * | 9/1996 | Hemsen | F16K 31/0696 | 137/625.65 |
| 6,000,417 A * | 12/1999 | Jacobs | F16K 15/023 | 137/2 |
| 6,209,970 B1 * | 4/2001 | Kamiya | B60T 8/363 | 137/596.17 |
| 6,268,784 B1 * | 7/2001 | Feigel | B60T 8/363 | 251/129.15 |
| 6,547,215 B2 * | 4/2003 | Matsusaka | F16K 31/0613 | 137/375 |
| 7,325,564 B2 * | 2/2008 | Ryuen | F16K 11/0716 | 137/375 |
| 9,080,686 B2 * | 7/2015 | Hoppe | F16K 31/082 | |
| 10,100,945 B2 * | 10/2018 | Dong | F16K 31/0658 | |
| 2004/0195278 A1 * | 10/2004 | Leeuw | B05C 5/0225 | 222/504 |
| 2004/0232372 A1 * | 11/2004 | McCombs | F16K 31/0696 | 251/129.15 |
| 2004/0245489 A1 * | 12/2004 | Kurita | F16K 3/188 | 251/195 |
| 2005/0051749 A1 * | 3/2005 | Lee | B60T 8/363 | 251/129.15 |
| 2008/0086966 A1 * | 4/2008 | Stevens | F16F 1/376 | 52/347 |
| 2009/0146091 A1 * | 6/2009 | Ams | F16K 31/10 | 251/129.16 |
| 2010/0108927 A1 * | 5/2010 | Perz | F16K 31/0655 | 251/129.15 |
| 2012/0012769 A1 * | 1/2012 | Ambrosi | F16K 31/0675 | 251/129.15 |
| 2012/0248357 A1 * | 10/2012 | Jeon | B60T 15/028 | 251/129.15 |
| 2013/0082199 A1 * | 4/2013 | Matsumoto | F16K 39/022 | 251/129.07 |
| 2017/0069464 A1 * | 3/2017 | Ye | H01L 21/67103 | |
| 2017/0154716 A1 * | 6/2017 | Mclauchlan | F16K 31/54 | |
| 2018/0229706 A1 * | 8/2018 | Jeon | B60T 13/686 | |
| 2020/0079340 A1 * | 3/2020 | Courth | F16K 31/06 | |

* cited by examiner

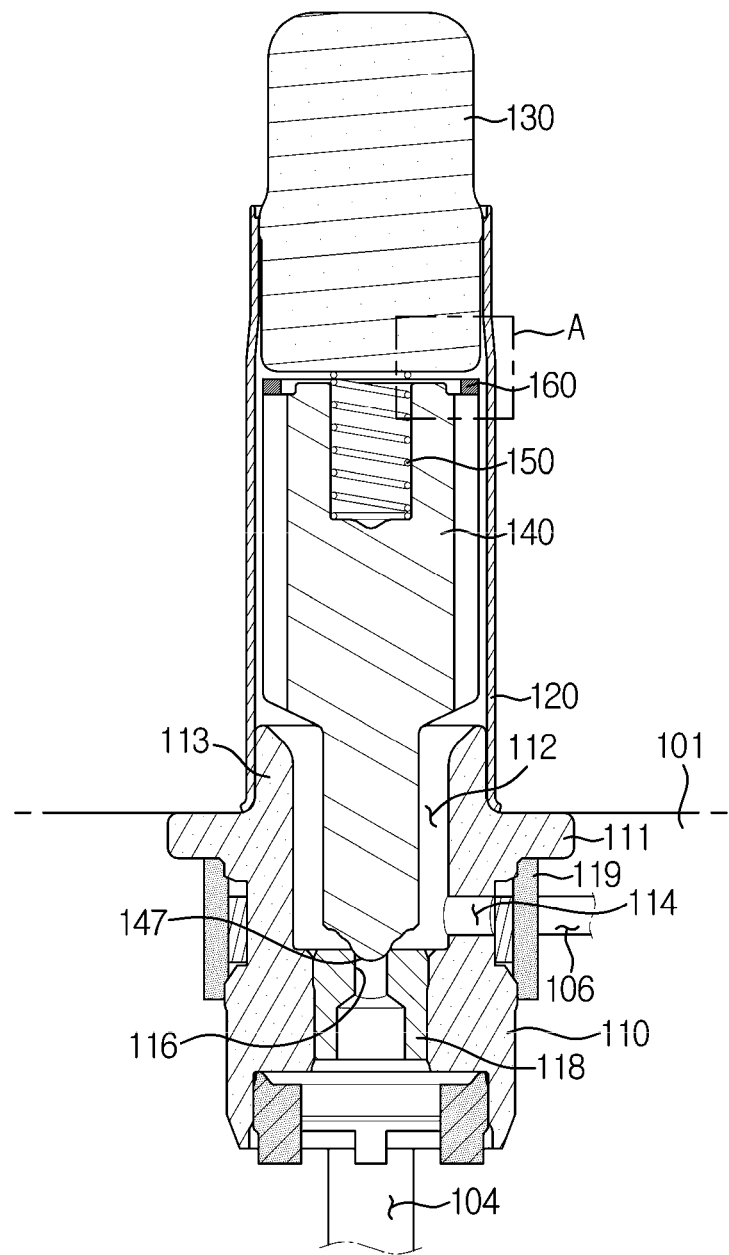
[FIG. 1]

[FIG. 2]
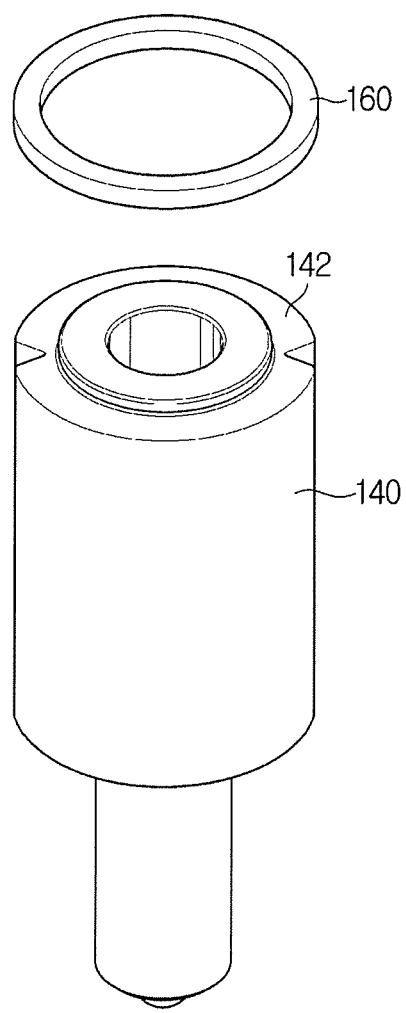

[FIG. 3]
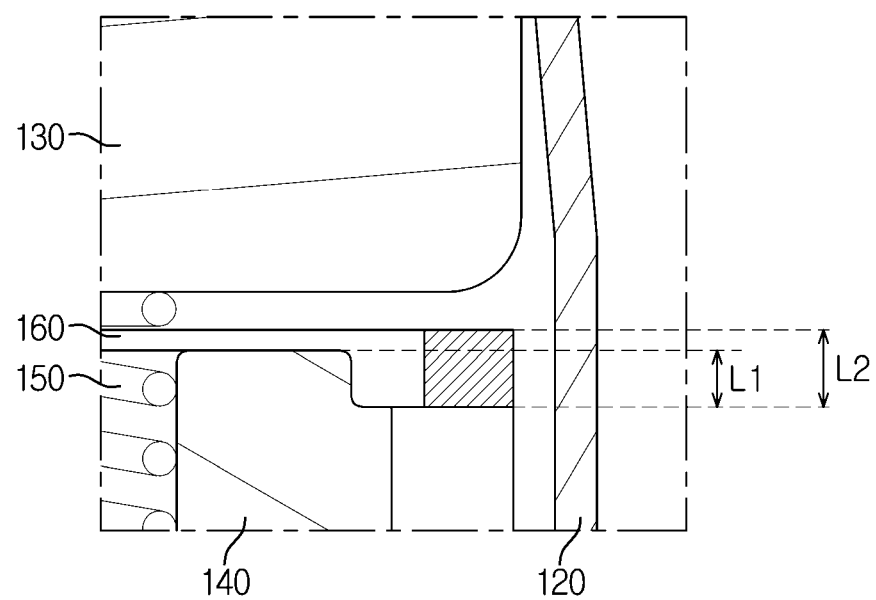

[FIG. 4]
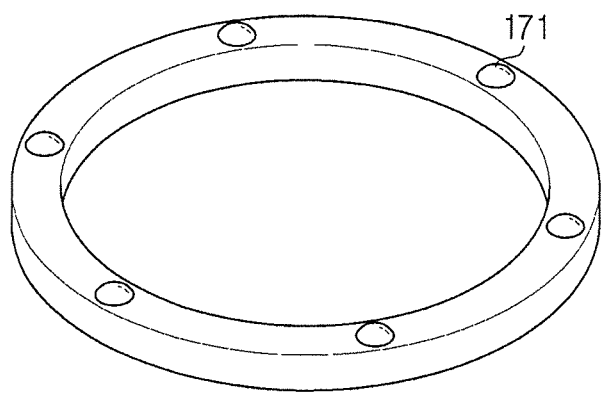

[FIG. 5]
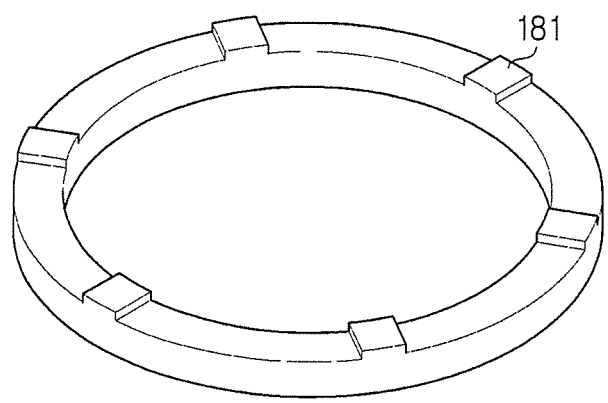

SOLENOID VALVE FOR BRAKE SYSTEM

CROSS-REFERENCE TO RELATED APPLICATION

This application is based on and claims priority under 35 U.S.C. § 119 to Korean Patent Applications No. 10-2017-0123541, filed on Sep. 25, 2017 in the Korean Intellectual Property Office, the disclosures of which are incorporated by reference herein in their entireties.

BACKGROUND

1. Field

The present disclosure relates to a solenoid valve for brake system, and more particularly, to a solenoid valve for brake system capable of reducing noise and vibrations when operating.

2. Description of the Related Art

A general anti-lock brake system for vehicle senses the slip of wheels to control braking pressure applied toward the wheels, thereby preventing the wheels from being locked during braking. Therefore, the anti-lock brake system maintains the directivity of the wheels by preventing the wheels from slipping during braking to thus achieve safe braking.

The brake system includes a plurality of solenoid valves for opening or closing the flow path of a brake hydraulic line for the control of braking pressure. The solenoid valves include a normal open solenoid valve that is maintained normally in an open state, and a normal close solenoid valve that is maintained normally in a close state.

A typical normal open solenoid valve is installed in a modulator block, and in the modulator block, a valve bore is cut to install the valve therein. A valve core is inserted into and installed in the valve bore, while connecting to an internal flow path formed in the modulator block.

One end of the valve core is coupled with a cylindrical sleeve such that an armature installed in the internal cavity can move up and down. A plunger integrated into one end of the armature to open or close the orifice of a valve seat through an up/down movement of the armature is provided, and a restoring spring is installed between the plunger and the valve seat.

Meanwhile, the typical solenoid valve generates friction noise that can be recognized by a driver, when it operates. When the armature of the solenoid valve moves up and down, the upper and lower surfaces of the armature collide with the sleeve, etc. accommodating the armature, thereby generating friction noise. When the friction noise is excessive, a problem arises.

[Prior Art Document]
Korean Laid-open Patent Application No. 1996-7004741 (Laid-open on Oct. 9, 1996)

SUMMARY

Therefore, it is an aspect of the present disclosure to provide a solenoid valve for brake system capable of reducing the generation of noise.

Additional aspects of the disclosure will be set forth in part in the description which follows and, in part, will be obvious from the description, or may be learned by practice of the disclosure.

In accordance with an aspect of the present disclosure, a solenoid valve for brake system includes: a valve housing installed in a modulator block, and having an oil flow path; a valve seat installed in the inside of the valve housing, and forming an orifice; an armature configured to move up and down by a magnet core in the valve housing, and to open or close the orifice; a sleeve coupled with the valve housing, and accommodating the armature therein; a restoring spring configured to provide an elastic restoring force to the armature to close the orifice normally; and a damper member interposed between the magnet core and the armature.

The damper member may be in the shape of a ring, and a dent portion on which the damper member is rested may be formed at a top edge of the armature.

A difference between a thickness L2 of the damper member 160 and a thickness L1 of the dent portion 142 may be 0.1 mm or more.

A protrusion may be formed in the shape of a half sphere on one surface of the damper member facing the magnet core.

A protrusion may be formed in the shape of a cube-like shape on one surface of the damper member facing the magnet core.

The damper member may be made of polyetherether ketone (PEEK).

BRIEF DESCRIPTION OF THE DRAWINGS

These and/or other aspects of the disclosure will become apparent and more readily appreciated from the following description of the embodiments, taken in conjunction with the accompanying drawings of which:

FIG. 1 shows a solenoid valve for brake system according to a first embodiment of the present disclosure;

FIG. 2 shows a damper member and an armature according to a first embodiment of the present disclosure;

FIG. 3 is an enlarged view of an area A of FIG. 1;

FIG. 4 shows a damper member according to a second embodiment of the present disclosure; and FIG. 5 shows a damper member according to a third embodiment of the present disclosure.

DETAILED DESCRIPTION

Hereinafter, embodiments of the present disclosure will be described in detail with reference to the accompanying drawings. The following embodiments are provided to transfer the technical concepts of the present disclosure to one of ordinary skill in the art. However, the present disclosure is not limited to these embodiments, and may be embodied in another form. In the drawings, parts that are irrelevant to the descriptions may be not shown in order to clarify the present disclosure, and also, for easy understanding, the sizes of components are more or less exaggeratedly shown.

FIG. 1 shows a solenoid valve for brake system according to a first embodiment of the present disclosure, FIG. 2 shows a damper member and an armature according to a first embodiment of the present disclosure, and FIG. 3 is an enlarged view of the damper member and the armature according to the first embodiment of the present disclosure.

Referring to FIGS. 1, 2, and 3, the solenoid valve for brake system according to the first embodiment of the present disclosure may include a valve housing 110 installed in a modulator block 101 and having an oil flow path, a valve seat 118 installed in the inside of the valve housing 110 and forming an orifice 116, an armature 140 moving up and down by a magnet core 130 in the valve housing 110 to open or close the orifice 116, a sleeve 120 coupled with the valve housing 110 and accommodating the armature 140 therein, a restoring spring 150 for providing an elastic restoring force to the armature 140 to close the orifice 116 normally, and a damper member 160 interposed between the magnet core 130 and the armature 140.

The valve housing 110 may be buried in the modulator block 101 to be installed in the modulator block 101. The valve housing 110 may include a first oil flow path 112 that opens in a longitudinal direction (that is, an up-down direction) of the valve housing 110, and a second oil flow path 114 that opens in a circumferential direction of the valve housing 110 to communicate the inside of the valve housing 110 with the outside. The first oil flow path 112 that opens in the up-down direction may communicate with a discharge flow path 104 of the modulator block 101 at the lower end, and the second oil flow path 114 may communicate with an inlet flow path 106 of the modulator block 101.

In the inside of the valve housing 110, the valve seat 118 in which the orifice 116 is formed may be disposed, and the valve seat 118 may be pressed in the inside of the valve housing 110 when the valve housing 110 is assembled. The valve seat 118 may selectively communicate the first oil flow path 112 with the discharge flow path 104 through the orifice 116, and the second oil flow path 114 may be formed around above the valve seat 118 to communicate the inlet flow path 106 with the first oil flow path 112.

At the outer end of the second oil flow path 114 of the valve housing 110, a filter 119 for filtering out foreign materials from oil entering through the inlet flow path 106 of the modulator block 101 may be disposed. The filter 119 may be assembled with the valve housing 110 or integrated into the valve housing 110, like the valve seat 118.

Also, on the upper outer surface of the valve housing 110, an expanding portion 111 for installing the valve housing 110 in the modulator block 101, and a flange portion 113 protruding upward for coupling the valve housing 110 with the sleeve 120 may be formed.

The sleeve 120 may be in the shape of a cylinder whose upper and lower sides open, and the lower portion of the sleeve 120 may be coupled with the flange portion 113 formed on the outer surface of the valve housing 110. When the valve housing 110 is coupled with the sleeve 120, oil passed through the filter 119 may enter the sleeve 120 through the second oil flow path 114 and the first oil flow path 112.

The magnet core 130 may be pressed in the upper portion of the sleeve 120 and coupled with the sleeve 120 to close the open upper portion of the sleeve 120. Although not shown in the drawings, a coupling groove may be formed in the magnet core 120 in order to more tightly couple the magnet core 120 with the sleeve 120, and the sleeve 120 may be pressed and caught by the coupling groove. The coupling structure between the magnet core 130 and the sleeve 120 may be to facilitate coupling of the magnet core 130 with the sleeve 120 and to simplify a process of coupling the magnet core 130 with the sleeve 120, compared to typical welding methods.

The armature 140 may move up and down in the inside of the sleeve 120, and include a large diameter portion and a small diameter portion. The large diameter portion may be guided by the sleeve 120 when the armature 140 moves up and down, and the end of the small diameter portion may contact the valve seat 118 in the valve housing 110.

At the end of the small diameter portion of the armature 140, an opening and closing portion 147 may be provided to close the orifice 116 of the valve seat 118. The opening and closing portion 147 may selectively open or close the orifice 116 when the armature 140 moves up or down.

The restoring spring 150 may be disposed between the armature 140 and the magnet core 130 to normally press the armature 140 toward the valve seat 118. The restoring spring 150 may be rested in a spring accommodating groove formed in the upper portion of the armature 140. The restoring spring 150 accommodated in the spring accommodating groove may press the armature 140 toward the valve seat 118 from the magnet core 130, thereby normally maintaining the opening and closing portion 147 in a state of closing the orifice 116 (normal close type).

When the solenoid valve 100 is installed in the modulator block 101, the valve housing 110 coupled with the sleeve 120 may be inserted into a bore of the modulator block 101, and in this state, an inlet of the bore of the modulator block 101 may be deformed (caulked) to fix the solenoid valve 100. Then, the modulator block 101 made of an aluminum material may surround the expanding portion 111 of the valve housing 110 and one end of the sleeve 120 by the inlet of the bore through caulking deformation, thereby firmly fixing the solenoid valve 100.

Hereinafter, opening and closing operations of the solenoid valve 100 for brake system having the above-described structure will be described. When the magnet core 130 is not driven, the restoring spring 150 may push the armature 140 toward the orifice 116 so that the opening and closing portion 147 closes the orifice 116. At this time, no oil may flow to the discharge flow path 104 from the inlet flow path 106 of the modulator block 101.

When the magnet core 130 is driven, the armature 140 may overcome the elastic force of the restoring spring 150 by a magnetic force applied between the armature 140 and the magnet core 130 to move toward the magnet core 130, and accordingly, the opening and closing portion 147 may be spaced from the orifice 116 to thus open the orifice 116. If the orifice 116 opens, oil entered through the inlet flow path 106 may pass through the filter 119 to flow to the first oil flow path 112 through the second oil flow path 114 of the valve housing 110, and then be discharged to the discharge flow path 104 via the first oil flow path 112 and the orifice 116.

In the inside of the solenoid valve 100 according to the first embodiment of the present disclosure, the damper member 160 for reducing noise may be disposed. The damper member 160 may be a ring-shaped support, and improve assembly while securing price competitiveness. The damper member 160 may be made of polyetherether ketone (PEEK).

Meanwhile, at the top edge of the armature 140, a dent portion 142 may be formed on which the damper member 160 is rested. The armature 140 may be a step type having a large diameter portion and a small diameter portion to form the dent portion 142. A difference between a thickness L2 of the damper member 160 and a thickness L1 of the dent portion 142 may be 0.1 mm or more.

As such, according to the current embodiment, the damper member 160 may be disposed in the shape of a ring between the armature 140 and the magnet core 130 to reduce noise. In other words, the damper member 160 which is an injection molded product may provide a damping effect to minimize friction sound. The results of a test for measuring friction sound show that a noise vibration value has been improved by about 24 dB.

FIG. 4 shows a damper member according to a second embodiment of the present disclosure. Referring to FIG. 4, a protrusion 171 may be formed in the shape of a half sphere on one surface of a damper member 170 facing the magnet core 130. The protrusion 171 may reduce an impact generated when the armature 140 collides with the magnet core 130, etc.

FIG. 5 shows a damper member according to a third embodiment of the present disclosure. Referring to FIG. 5, a protrusion 181 may be formed in the shape of a cube-like shape on one surface of a damper member 180 facing the magnet core 130.

In the inside of the solenoid valve for brake system according to the present disclosure, the damper member for reducing noise may be disposed, and the damper member may be a ring-shaped support, and improve assembly while securing price competitiveness.

Also, at the top edge of the armature, the dent portion may be formed on which the damper member is rested. The difference between the thickness of the damper member and the thickness of the dent portion may be 0.1 mm or more to minimize friction sound through the damping effect of the damper member which is an injection molded product.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A solenoid valve for a brake system comprising:
   a valve housing disposed in a modulator block, and having an oil flow path;
   a valve seat disposed in an inside of the valve housing, and having an orifice;
   an armature configured to move up and down in the valve housing by a magnet core to open or close the orifice;
   a sleeve coupled with the valve housing, and accommodating the armature therein;
   a restoring spring configured to provide an elastic restoring force to the armature to close the orifice normally; and
   a damper member interposed between the magnet core and the armature and spaced apart from the restoring spring, the damper member being a separate member from the armature,
   wherein the armature having a large diameter portion and a small diameter portion to form a dent portion, the dent portion having a first surface on which the damper member is disposed,
   an inner circumferential surface of the damper member is disposed outwardly of an outer circumferential surface of the small diameter portion in a radial direction,
   a thickness of the damper member in a first direction is greater than a depth of the dent portion, the first direction being defined as a direction from a top edge of the armature to the first surface of the dent portion and the depth of the dent portion being defined as a distance from the top edge of the armature to the first surface of the dent portion, and
   the first surface of the dent portion extends to an outer circumferential surface of the large diameter portion of the armature to be opened in the radial direction.

2. The solenoid valve for the brake system according to claim 1, wherein the thickness of the damper member is greater than a thickness of the small diameter portion.

3. The solenoid valve for the brake system according to claim 1, wherein a height of the damper member is greater than a height of the small diameter portion based on the first direction in which the armature is configured to move up or down.

4. A solenoid valve for a brake system comprising:
   a valve housing disposed in a modulator block, and having an oil flow path;
   a valve seat disposed in an inside of the valve housing, and having an orifice;
   an armature configured to move up and down in the valve housing by a magnet core to open or close the orifice;
   a sleeve coupled with the valve housing, and accommodating the armature therein;
   a restoring spring configured to provide an elastic restoring force to the armature to close the orifice normally; and
   a damper member interposed between the magnet core and the armature and spaced apart from the restoring spring, the damper member being a separate member from the armature,
   wherein a dent portion, defined at a top edge of the armature, includes a first surface on which the damper member is disposed in a first direction, the first direction being defined as a direction from the top edge of the armature to the first surface of the dent portion,
   a thickness of the damper member in the first direction is greater than a depth of the dent portion in the first direction, the depth being defined as a distance from the top edge of the armature to the first surface of the dent portion in the first direction, and
   the first surface of the dent portion extends to an outer circumferential surface of the armature to be opened in a radial direction.

5. The solenoid valve for the brake system according to claim 4, wherein the damper member is in a shape of a ring.

6. The solenoid valve for the brake system according to claim 4, wherein a protrusion is formed in a shape of a half sphere on one surface of the damper member facing the magnet core.

7. The solenoid valve for the brake system according to claim 4, wherein a protrusion is formed in a cube-like shape on one surface of the damper member facing the magnet core.

8. The solenoid valve for the brake system according to claim 1, wherein the damper member includes polyetheretherketone (PEEK).

9. A solenoid valve for a brake system comprising:
   a valve housing disposed in a modulator block, and having an oil flow path;
   a valve seat disposed in an inside of the valve housing, and having an orifice;
   an armature configured to move up and down in the valve housing by a magnet core to open or close the orifice;
   a sleeve coupled with the valve housing, and accommodating the armature therein;
   a restoring spring configured to provide an elastic restoring force to the armature to close the orifice normally; and
   a damper member interposed between the magnet core and the armature and spaced apart from the restoring spring, the damper member being a separate member from the armature,
   wherein the damper member includes a protrusion which is higher in height than other parts of the damper member,
   a dent portion is formed at a top edge of the armature and includes a first surface on which the damper member is disposed in a first direction, the first direction being defined as a direction from the top edge of the armature to the first surface of the dent portion, a thickness of the highest part of the damper member is greater than a depth of the dent portion in the first direction, the thickness of the highest part of the damper member being defined as a distance from the highest part of the protrusion to a bottom surface of the damper member, the depth of the dent portion being defined as a distance from the top edge of the armature to the first surface of the dent portion in the first direction, and the first surface of the dent portion extends to an outer circumferential surface of the armature to be opened in a radial direction.

10. The solenoid valve for the brake system according to claim 9, wherein the protrusion is formed in a shape of a half sphere.

11. The solenoid valve for the brake system according to claim 9, wherein the protrusion is formed in a cube-like shape.

* * * * *

UNITED STATES PATENT AND TRADEMARK OFFICE
CERTIFICATE OF CORRECTION

| | |
|---|---|
| PATENT NO. | : 11,110,905 B2 |
| APPLICATION NO. | : 16/139152 |
| DATED | : September 7, 2021 |
| INVENTOR(S) | : In Wook Jeon |

It is certified that error appears in the above-identified patent and that said Letters Patent is hereby corrected as shown below:

On the Title Page

Item (72) "In Wook Wook Jeon, Seoul (KR)"
Should read:
--In Wook Jeon, Seoul (KR)--

Signed and Sealed this
Twenty-ninth Day of November, 2022

Katherine Kelly Vidal
*Director of the United States Patent and Trademark Office*